United States Patent
Zhang et al.

(10) Patent No.: US 12,478,700 B1
(45) Date of Patent: *Nov. 25, 2025

(54) SAFE ULTRAVIOLET OPTICAL SOURCE AND SAFE INDOOR AIR DISINFECTION SYSTEM

(71) Applicant: BOLB Inc., Livermore, CA (US)

(72) Inventors: Jianping Zhang, Arcadia, CA (US); Ling Zhou, Dublin, CA (US); Ying Gao, Fremont, CA (US); Huazhong Deng, Maoming (CN); Maria Topete, Livermore, CA (US)

(73) Assignee: BOLB Inc., Livermore, CA (US)

( * ) Notice: Subject to any disclaimer, the term of this patent is extended or adjusted under 35 U.S.C. 154(b) by 448 days.

This patent is subject to a terminal disclaimer.

(21) Appl. No.: 18/159,533

(22) Filed: Jan. 25, 2023

(51) Int. Cl.
*A61L 2/24* (2006.01)
*A61L 2/10* (2006.01)
*A61L 9/20* (2006.01)

(52) U.S. Cl.
CPC ............... *A61L 2/24* (2013.01); *A61L 2/10* (2013.01); *A61L 9/20* (2013.01); *A61L 2202/11* (2013.01); *A61L 2202/14* (2013.01); *A61L 2202/25* (2013.01); *A61L 2209/111* (2013.01); *A61L 2209/12* (2013.01)

(58) Field of Classification Search
CPC ..... A61L 2/24; A61L 2/10; A61L 9/20; A61L 2202/11; A61L 2202/14; A61L 2202/25; A61L 2209/111; A61L 2209/12
See application file for complete search history.

(56) References Cited

U.S. PATENT DOCUMENTS

| | | | | |
|---|---|---|---|---|
| 8,575,567 | B2* | 11/2013 | Lyslo | A61L 2/24 |
| | | | | 250/455.11 |
| 9,370,600 | B1* | 6/2016 | DuPuis | F21V 14/08 |
| 9,855,353 | B1* | 1/2018 | Stacy | A61L 2/10 |
| 10,613,030 | B2* | 4/2020 | Llamido | A61L 2/24 |
| 10,816,939 | B1* | 10/2020 | Coleman | G01S 17/86 |

(Continued)

FOREIGN PATENT DOCUMENTS

| | | | | |
|---|---|---|---|---|
| CN | 105518380 A | * | 4/2016 | H05B 45/10 |
| CN | 106540289 A | * | 3/2017 | |

(Continued)

OTHER PUBLICATIONS

Allen, et al., Inactivation of pathogens in air using ultraviolet direct irradiation below exposure limits, Journal of Research of the National Institute of Standards and Technology, 2021, pp. 1-24.

(Continued)

*Primary Examiner* — Regina M Yoo
(74) *Attorney, Agent, or Firm* — Cooley LLP

(57) ABSTRACT

An indoor disinfection system has a collection of lighting units. Each lighting unit includes a germicidal ultraviolet (GUV) light source emitting a GUV light cone with a cone angle less than 60 degrees. The GUV light cone contains optical power with wavelengths between 10-280 nm. A human presence sensor has a field of view cone angle greater than the GUV light cone angle. The human presence sensor generates a human presence signal in response to a human in the field of view. A controller receives the human presence signal and in response thereto disables the GUV light source.

17 Claims, 14 Drawing Sheets

(56) References Cited

U.S. PATENT DOCUMENTS

| | | | |
|---|---|---|---|
| 2009/0314308 A1* | 12/2009 | Kim | A61L 2/0088 134/1 |
| 2010/0296971 A1* | 11/2010 | Gaska | C02F 1/325 422/62 |
| 2011/0054574 A1* | 3/2011 | Felix | A61N 5/06 250/493.1 |
| 2012/0305804 A1* | 12/2012 | Goldman | E05B 1/0069 250/492.1 |
| 2014/0252247 A1* | 9/2014 | Moskowitz | A61L 2/10 250/492.1 |
| 2015/0199883 A1* | 7/2015 | Hartley | A47K 5/1217 340/686.6 |
| 2016/0128526 A1* | 5/2016 | Dobrinsky | A47K 13/302 4/233 |
| 2016/0213798 A1* | 7/2016 | Paver, Jr. | A61L 2/22 |
| 2017/0080117 A1* | 3/2017 | Gordon | A61L 2/084 |
| 2018/0021465 A1* | 1/2018 | Dobrinsky | E03D 9/08 4/233 |
| 2018/0117194 A1* | 5/2018 | Dobrinsky | G01N 21/6486 |
| 2019/0336629 A1* | 11/2019 | Dobrinsky | A61L 2/10 |
| 2020/0205619 A1* | 7/2020 | Gadde | A61L 2/0047 |
| 2020/0215213 A1* | 7/2020 | Bryant | G06F 1/1601 |
| 2021/0015959 A1* | 1/2021 | Goseki | A61L 9/20 |
| 2021/0101805 A1* | 4/2021 | Zhang | C02F 1/325 |
| 2021/0145994 A1 | 5/2021 | Dombrowsky et al. | |
| 2021/0322595 A1 | 10/2021 | Colvin et al. | |
| 2021/0402040 A1* | 12/2021 | Botts | A61L 9/20 |
| 2022/0062468 A1* | 3/2022 | Rodriguez | G06T 7/50 |

FOREIGN PATENT DOCUMENTS

| | | | | |
|---|---|---|---|---|
| CN | 113688964 A | * | 11/2021 | G06F 18/214 |
| EE | 9600064 A | | 12/1996 | |
| WO | WO-2018101943 A1 | * | 6/2018 | A61L 2/24 |
| WO | WO-2019086903 A1 | * | 5/2019 | H10H 20/855 |
| WO | WO-2021101431 A1 | * | 5/2021 | A61L 2/10 |

OTHER PUBLICATIONS

Blatchley III, et al., SARS-CoV-2 ultraviolet radiation dose-response behavior, Journal of Research of the National Institute of Standards and Technology, 2021, 11 pages.

Co-pending U.S. Appl. No. 18/184,587, inventor Jianping Zhang, filed Mar. 15, 2023.

* cited by examiner

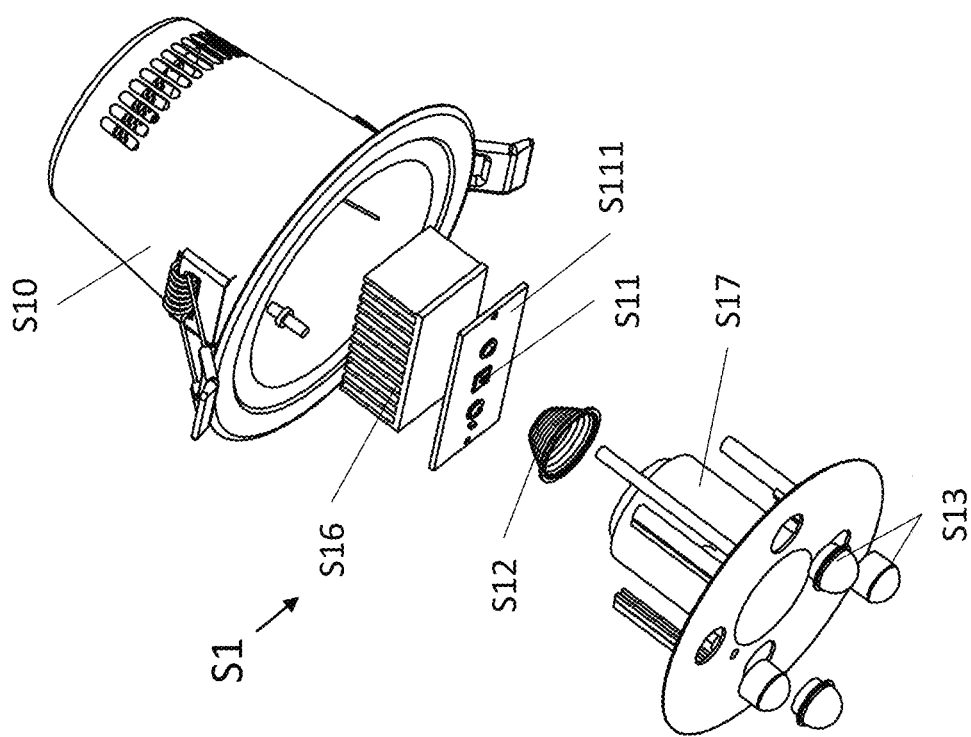

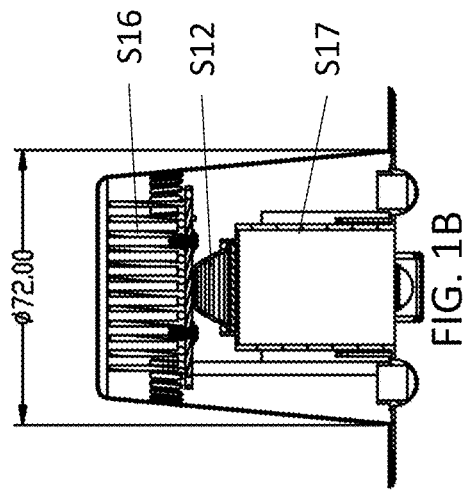
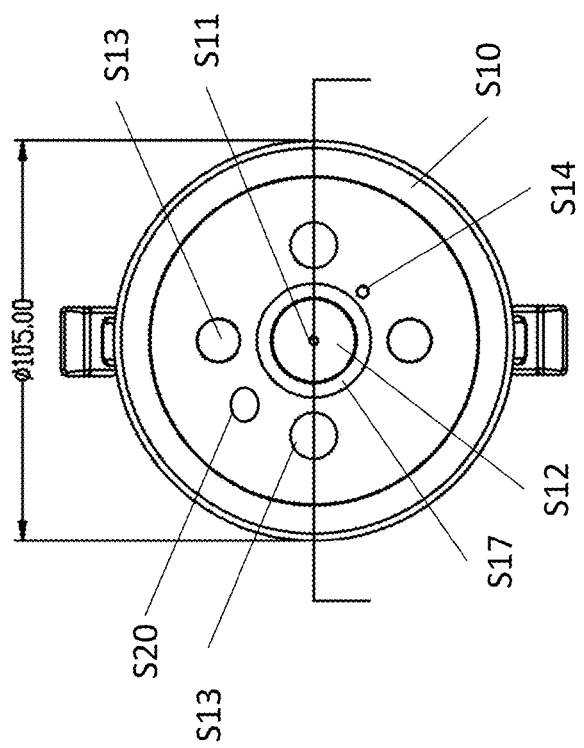
FIG. 1B
FIG. 1C

SAFE ULTRAVIOLET OPTICAL SOURCE AND SAFE INDOOR AIR DISINFECTION SYSTEM

TECHNICAL FIELD

The present disclosure relates generally to air disinfection. More particularly, disclosed is a safe ultraviolet optical source (SUVOS) and safe indoor air disinfection system (SIADS).

DESCRIPTION OF RELATED ART

Airborne viruses are responsible for epidemic and pandemic outbreaks. There is a growing need for air disinfection to mitigate pandemic outbreaks such as coronavirus disease 2019 (Covid-19). Unlike surface and water disinfection, air disinfection has its own characteristics and challenges. A conventional air disinfection approach uses remote physical separation (e.g., air filtration) to remove microbes from air or remote disinfection mechanisms such as ultraviolet light, ozone, or plasma et al. to deactivate pathogens in air. For air disinfection to be effective, all these remote mechanisms require rigorous air circulation. For a confined space of volume V, assuming the absence of new pathogen generation, the pathogen counts in the space evolve according to the following equation:

$$N(t) = N_0 e^{-\rho \frac{G}{V} t} \quad (1)$$

where $N_0$ and $N(t)$ are the pathogen counts at time zero and t, respectively; G and $\rho$ are the air flowrate and flow disinfection rate, respectively. The term $$\rho \frac{G}{V}$$

is the key to air disinfection effectiveness and it can be defined as $$\kappa = \rho \frac{G}{V}.$$

Here K is equivalent to the clean air (free of pathogens) changes per hour (CACH, or K). Hence, conventional air disinfection systems using remote pathogen removal or deactivation are not energy efficient as they rely heavily on the air circulation flowrate. The American Society of Heating, Refrigerating and Air-Conditioning Engineers (ASHRAE) recommends ventilation rates for most indoor scenarios to be 0.35-8 clean air changes per hour, translating into ~0.6-13 hours to reach a room air disinfection rate of 99%, which is still ineffective to prevent airborne disease transmissions. Further, high CACH is not only energy intense but also uncomfortable for people in the building.

When using germicidal ultraviolet light (GUV, wavelengths in the range of 10-280 nm) for air disinfection, under the diluted conditions, i.e., pathogens incapable of shadowing each other from GUV light, the pathogen population will decay exponentially with the received GUV dose:

$$N = N_0 \times 10^{-\frac{J}{D_{90}}} \quad (2)$$

where J is the received GUV dose, and $D_{90}$ is the GUV dose for the pathogen of 10% survival rate. From equation (2), it is clear that to have 10%, 1%, 0.1%, 0.01%, and 0.001% pathogen survival rates i.e., to have kill rates of 90%, 99%, 99.9%, 99.99%, and 99.999%, respectively, one has to deliver GUV doses of $D_{90}$, $2D_{90}$, $3D_{90}$, $4D_{90}$, and $5D_{90}$, respectively. Comparing equations (1) and (2), one can reach a useful connection of GUV dose to CACH:

$$\kappa = \rho \frac{G}{V} = \frac{I_{60}}{D_{90}} \ln 10 \quad (3)$$

where $I_{60}$ is the received GUV dose per hour. And the time to achieve 99% disinfection rate, $t_{0.99}$, is given by:

$$t_{0.99} = -\frac{\ln(1 - 0.99)}{\kappa} \quad (4)$$

For most ribonucleic acid (RNA) based viruses in air (e.g., severe acute respiratory syndrome coronavirus 2 (SARS-CoV-2) and influenza A viruses), their $D_{90}$ is about 0.5 mJ/cm² (see, e.g., Ernest R. Blatchley III, et al, Journal of Research of the National Institute of Standards and Technology, Volume 126, Article No. 126018 (2021). Equations (3) and 4 therefore point to an efficient air disinfection approach using GUV light. For example, if in one hour a GUV dose of 20 mJ/cm² is delivered to the room air, it is equivalent to ~92 CACH for the room to disinfect SARS-CoV-2 and influenza viruses. And the time to achieve 99% disinfection rate, $t_{0.99}$, is as short as 3 minutes. This is significant to public health if one can find safe and efficient solutions to give indoor air hourly GUV doses above 10 mJ/cm².

The challenge faced is that GUV light is harmful to human skin and eyes. There is need to prevent the direct exposure of GUV to humans. In the prior art, GUV is applied to the upper room to disinfect air, avoiding GUV exposure to the spaces occupied by humans. Upper room air disinfection still requires air circulation to make effective indoor air disinfection. There are also proposals to use direct GUV irradiation to the whole room, however, to maintain the GUV intensity to such a low level, that even for 8 hour continuous exposure to human beings there is no harm to be expected to the human skin and eyes (e.g., see Gary R. Allen et al, Journal of Research of the National Institute of Standards and Technology, Volume 126, Article No. 126052 (2021). This approach is either inefficient (too slow) to disinfect air or has to rely on new kinds of GUV light that can quickly deliver enough doses to disinfect pathogens yet do no harm to humans.

Thus, there is a need for new techniques to disinfect ambient pathogens, while protecting humans from ancillary harm.

SUMMARY

An indoor disinfection system has a collection of lighting units. Each lighting unit includes a germicidal ultraviolet (GUV) light source emitting a GUV light cone with a cone angle less than 60 degrees. The GUV light cone contains optical power with wavelengths between 10-280 nm. A human presence sensor has a field of view cone angle greater than the GUV light cone angle. The human presence sensor generates a human presence signal in response to a human in the field of view. A controller receives the human presence signal and in response thereto disables the GUV light source.

BRIEF DESCRIPTION OF THE DRAWINGS

The accompanying drawings, which are included to provide a further understanding of the disclosure and constitute a part of this application, illustrate embodiments of the invention and together with the description serve to explain the principle of the disclosure. Like reference numbers in the figures refer to like elements throughout.

FIG. 1A is an exploded view of a safe ultraviolet optical source according to an embodiment of the invention.

FIG. 1B is a cross-sectional view of the safe ultraviolet optical source.

FIG. 1C is a bottom view of the safe ultraviolet optical source.

DETAILED DESCRIPTION OF EMBODIMENTS

FIG. 1A is an exploded view of a safe ultraviolet optical source (SUVOS) S1 according to one aspect of the present disclosure. SUVOS S1 includes a housing and mount structure S10 to protect the whole unit and facilitate ceiling mounting. A heatsink S16 dissipates heat generated by GUV light-emitting diode (LED) S11 and circuit board S111 (also referred to as a controller S111). A reflector S12 is used to shape a desired optical light cone, which is transmitted through light baffle S17 (also referred to as reflector channel S17). Human presence sensors S13 are used to identify proximate humans and then deactivate optical light.

FIG. 1B is a cross-sectional view depicting the heatsink S16, reflector S12 and reflector channel S17.

FIG. 1C is a bottom view showing a LED S11, reflector S12, reflector channel S17 and human presence sensors S13. FIG. 1C also shows a status indicator S14 to indicate if GUV light is on or off. White LEDs S20 near S13 and surrounding S17, S12 and S11 may be used to provide general lighting. With the addition of white LEDs, SUVOS S1 can be a general lighting device as well as a safe indoor air disinfection system (SIADS) element device.

Figure 2:
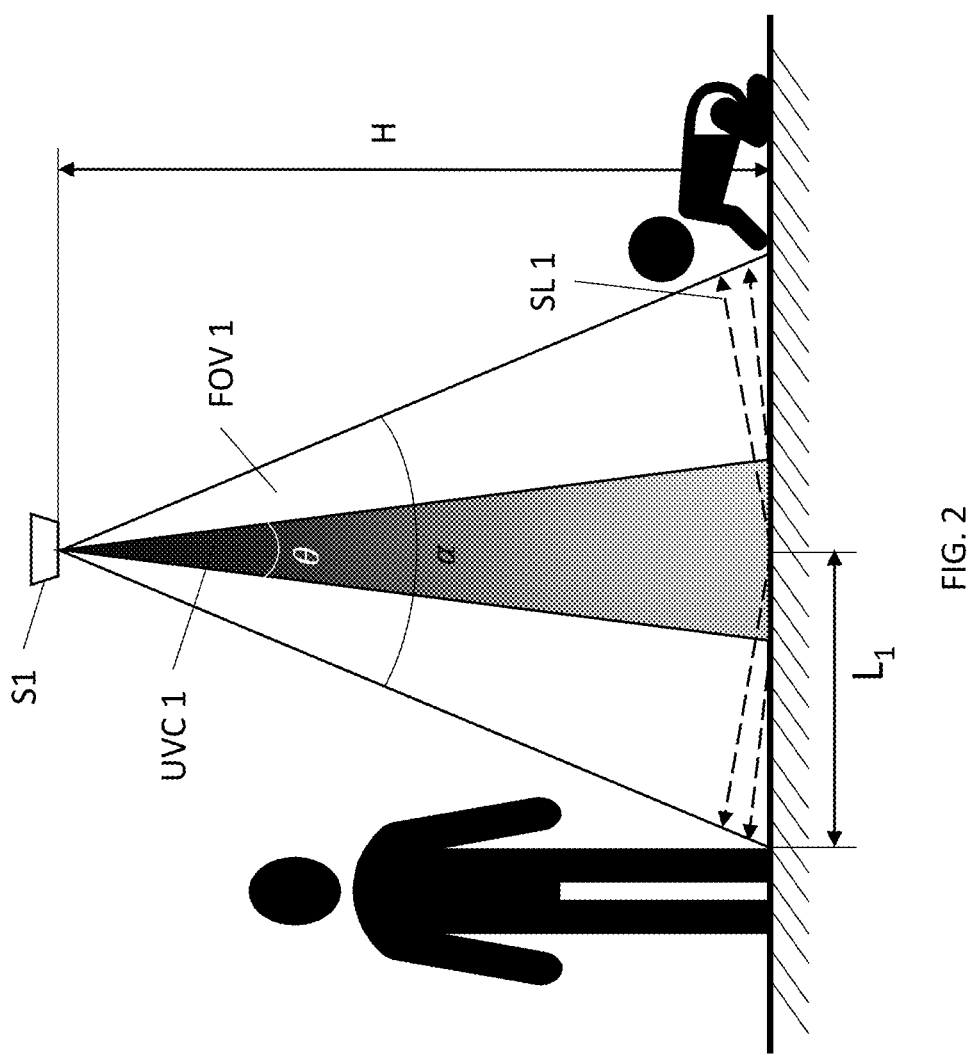
FIG. 2 shows a schematic of a safe ultraviolet optical source delivering a UV disinfection light cone and equipped with at least a field of view to detect human presence.

FIG. 2 illustrates S1 ceiling mounted as a downward lighting GUV light source. In this sense, SUVOS S1 can be integrated with a general lighting puck or fixture. S1 can deliver a GUV light cone UVC 1, of cone angle θ, which is optionally in the range of [0°, 60°], or 0≤400 according to one aspect of the present disclosure. It is intended that all of the GUV light is confined within the cone UVC 1. In practice, at least an absolute majority of the of the GUV light emitted by S1 (e.g., ≥90%, or ≥99%, or ≥99.9%) is confined within light cone UVC 1. The cone angle can be determined by a secondary optics such as a reflector (e.g., reflector S12 in FIG. 1A) and the tight confinement of the light within cone UVC 1 can be further enforced by a light baffle or reflector channel S17 shown in FIGS. 1A, 1B and 1C. The light baffle S17 can be a short hollow (a few cm long, e.g., 4 cm) GUV absorbing cylinder surrounding the GUV emitter (e.g., GUV light-emitting diode S11) and reflector S12. Stray rays escaping UVC 1 hitting baffle S17 will be absorbed. The light baffle can take any other suitable shape. When installed into a ceiling of typical height H~2.7 m, S1 optionally irradiates a GUV cone UVC 1 to the floor of a base radius of a few meters, e.g., 0.5-2.0 meters. That is, GUV cone UVC 1 has a floor base radius of a fraction of a meter to a few meters. UVC 1 can be a right circular cone, or be of other cone shapes confined by suitable secondary optics, or be a frustum of a light cone.

SUVOS S1 also possesses at least one human presence sensor S13 which can detect the presence of human within a field of view cone FOV 1 of cone angle α. It is required that α>θ. When θ∈[0°, 60°], α∈[20°, 120°]. To provide failsafe protection, S1 may have more than one human presence sensor of the same or similar field of view working in parallel configuration. The S1 embodiment shown in FIG. 1C has four human presence sensors S13. If one human presence sensor has a failure rate f during its factory lifetime, then the combined failure rate for N human presence sensors to fail simultaneously within their factory lifetime is $f^N$. For example, if $f=10^{-4}$, then for 4 human presence sensors working in parallel, the probability to fail detecting human presence in their lifetime then is $10^{-16}$. Other failsafe mechanisms to prevent failure detection of human presence within FOV 1 can also be applied.

GUV light within cone UVC 1 may escape the cone via scattering by air molecules, airborne particles or surfaces intercepting UVC 1. The design rule of the cones UVC 1 and FOV1 according to the present disclosure is to require a >0 and ensure that the scattered GUV intensity on the side surface of cone FOV1 being less than 100 nW/cm², e.g., in the range of 0-100 nW/cm². In some embodiments, the scattered GUV intensity SLI on the side surface of cone FOV 1 is expected to be the strongest near the base of the cone intercepting with a surface, e.g., a floor, and it has to be less than 100 nW/cm². In other words, the power intensity on the side surface of the GUV light cone in the vicinity of the base is less than 100 nW/cm². That is to say that the floor base circumference receives GUV power intensity of less than 100 nW/cm². In this specification, a room floor is used as the intercepting surface when discussing the scattered GUV intensity and cones UVC 1 and FOV 1. It is intended that the principle shall be applied to any other surfaces intercepting with cones UVC 1, for examples, an office desk, a chair, a stage on the floor, et al. A surface other than the floor intercepting cones UVC 1 will have either reduced or increased distance to the SUVOS S1 depending on whether the surface is above or below the floor plane, and the scattered GUV intensity SLI on the side surface of cone FOV 1 has to be less than 100 nW/cm².

The function of cone FOV 1 is to detect human presence. If there is a human within FOV 1, human presence sensor S13 sends signals to SUVOS S1 circuit board S111 to turn off the GUV LED S11. Suitable human presence sensors can be applied here, such as passive infrared (PIR) sensors, infrared laser-detector couplers, radio frequency sensors, and radars et al. The important requirements here are to ensure the suitable detection distance (a few meters, e.g., 0-10 m.), sensitivity and field of view angle $\alpha$ (e.g., 20-120°). If there is no human presence in the FOV 1, SUVOS S1 will turn on the GUV LED for an assigned period of time to accumulate a designed dose to the air. The tight confinement of GUV light within cone UVC 1 and the extremely reliable human presence detection make SUVOS S1 safe to disinfect indoor air with human occupants.

As air and GUV light co-exist in the cone UVC 1, GUV dose will be transferred to the air within UVC 1. The GUV light source S11 of SUOVS S1 is a point light source such as a GUV light-emitting diode (LED). From the far field point of view, the light intensity from a point light source has an inverse dependence with the square of the distance. It can be shown that within time t the average dose ($\bar{j}$) delivered to the air in the spherical cone inner tangential to cone UVC 1 (both cones are of the same cone angle $\theta$) is $$\bar{j} = \frac{P_o t (1 - e^{-\alpha H})}{\frac{\Omega}{3} H^3 \alpha},$$

where $P_o$, $\alpha$, $\Omega$, and $H$ are the optical power of S1, GUV absorption coefficient of air, solid angle of cone UVC 1, and height from the GUV LED to the floor, respectively. Further, as $\alpha$ of air is very small (less than $10^{-5}$ cm−1), one obtains $$\bar{j} = \frac{P_o t}{\frac{\Omega}{3} H^2}.$$

In an embodiment, more than one SUVOS S1 can be installed into a room ceiling, for example, an array of m S1 can be installed into a ceiling of area S, i.e., S1 has an average sheet density $$\sigma = \frac{m}{s}.$$

In this case, the array of SUVOS S1 forms a safe indoor air disinfection system (SIADS). It is noted that the SUVOS' in the array don't have to be uniformly distributed; they can be distributed to accommodate the space available for air disinfection. Then, within time t an average dose (J) delivered to the room air of volume SH can be shown to be within a range:

$$\sigma P_0 t < J < \sigma P_0 t \frac{\tan^2 \frac{\theta}{2}}{2\left(1 - \cos\frac{\theta}{2}\right)}.$$

When $\theta \leq 40°$, the lower and upper limits differ within 10%, hence the average GUV dose to the room air can be given as:

$$J = \sigma P_0 t \quad (5)$$

As per ASHRAE recommendation, for most indoor spaces a minimal average air flow velocity of a 0.1-0.2 m/s is required. This air velocity can effectively mix the air in and out of the GUV light cones UVC 1, distributing the average GUV dose/uniformly to the whole indoor air, within a few seconds or minutes depending on the SUVOS density installed on the ceiling. For example, for $\sigma=1$ m-2, the uniform distribution of GUV dose can take place in about 5-30 seconds, as air can easily move laterally into and out of the cones UVC 1, which are spaced away from each other of an average lateral distance less than 1 m. This is in sharp contrast to the difficulty in distributing GUV dose uniformly to indoor air experienced by the upper room GUV air disinfections, where the irradiated space is a thin layer of air in close proximity to the ceiling and the gravity pulling and the ceiling blockage of air are not in favor of air convection. The forced convection of air in the upper room air disinfection is energy intense if a fast air exchange is desired.

Using equations 3-5, the effectiveness of a SIADS employing an array of SUVOS can be computed. In the absence of human presence, the effectiveness can be described by a time ($t_\eta$) to kill a desired percentage (n) of pathogens within the room air. The time is given by equation (6):

$$t_\eta = -\frac{D_{90}}{\sigma P_o} \log(1 - \eta) \quad (6)$$

As seen, the effectiveness, or $t_\eta$, depends on four parameters: n, $D_{90}$ of the pathogen, the density ($\sigma$) of SUVOS S1, and the optical power ($P_o$) of a SUVOS S1. An example to show the effective of using SIADS to disinfection indoor air in the absence of human presence is given in Table 1.

TABLE 1

Effectiveness table of an embodiment of SIADS

| | |
|---|---|
| SUVOS optical power $P_o$, mW | 100 |
| Room area S, $m^2$ | 100 |
| SUVOS density σ, $m^{-2}$ | 1 |
| Dose to room air in one hour, $mJ/cm^2$ | 36 |
| Virus $D_{90}$, $mJ/cm^2$ | 0.5 |
| CACH, $hr^{-1}$ | 165.8 |
| $t_{0.99}$, min | 1.7 |
| $t_{0.999}$, min | 2.5 |
| $t_{0.9999}$, min | 3.3 |

Figure 3:
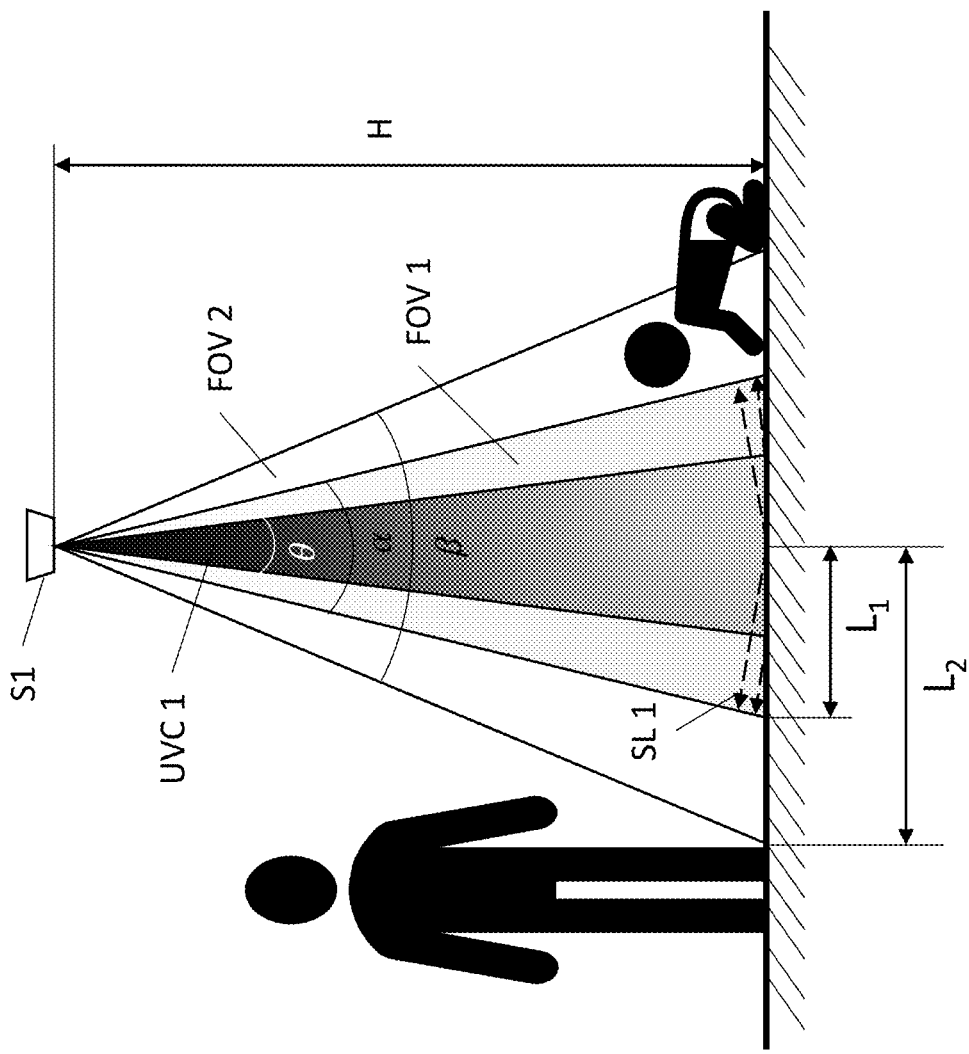
FIG. 3 shows a schematic of a safe ultraviolet optical source delivering a UV disinfection light cone and equipped with at least two different fields of view to detect human presence.
Figure 4:
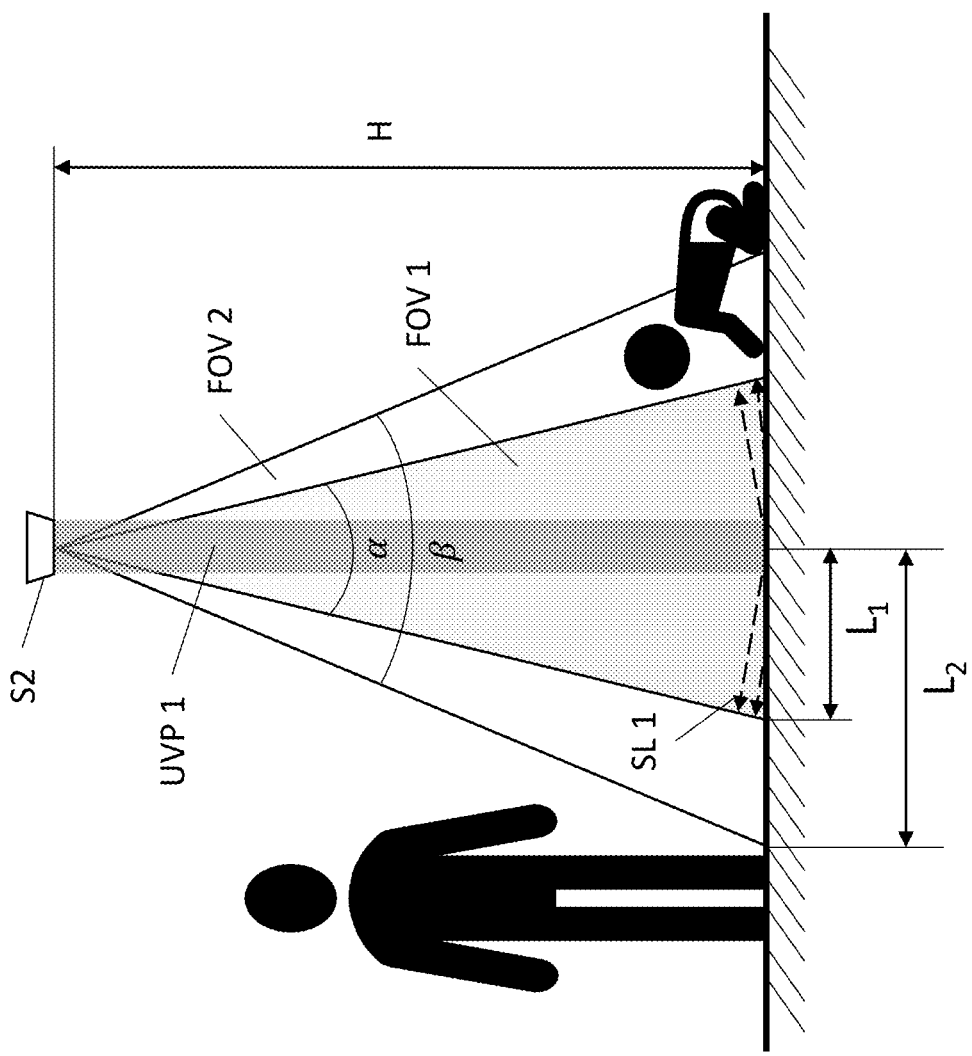
FIG. 4 shows a schematic of a safe ultraviolet optical source delivering a UV disinfection light pillar and equipped with at least two different fields of view to detect human presence.

For a SIADS applying SUVOS of optical power of 100 mW and sheet density of 1 $m^{-2}$, the time to disinfect even sterilize airborne viruses such as SARS-COV-2 and influenza virions is within a few minutes. Further, in view of the SUVOS optical power and sheet density, SIADS is going to be cost-effective as well. The optional ranges of SUVOS optical power $P_o$ and density σ can be 1-1000 mW and 0.02-2 $m^{-2}$, respectively.

Another embodiment of SUVOS S1 can be equipped with human presence sensors of two different fields of view, e.g., with a FOV 1 and a FOV 2, with respective cone angles α and β as shown in FIG. 3. The function of cone FOV 1 and FOV 2 is to detect human presence. If there is a human within FOV 1, human presence sensor S13 sends signals to SUVOS S1 circuit board S111 to turn off the GUV LED S11. The scattered GUV intensity on the side surface of cone FOV1 is designed to be less than 100 $nW/cm^2$, e.g., 0-100 $nW/cm^2$. In some embodiments, the scattered GUV intensity SLI on the side surface of cone FOV 1 is expected to be the strongest near the base of the cone intercepting with a surface, e.g., a floor, and it has to be less than 100 $nW/cm^2$. The additional cone FOV 2 can be used to dim the light source S11. When there is a human in FOV 2 and no human in FOV1, the respective human presence sensor will send signals to S1 and S1 will dim the GUV light output power to a designed level, such as to 50%, or 10% of the original GUV output power. β>α>θ. When θ∈[0°, 60°], α, β∈[20°, 120°]. FOV2 includes FOV1. GUV LED 11 only emits GUV light when no human is in FOV1.

Returning to the exploded, cross-sectional and bottom views of FIGS. 1A, 1B and 1C, the key elements of S1 includes a GUV LED S11, a circuit board S111, a cone defining reflector S12, a light baffle S17 and a few (4 shown) human presence sensors S13. GUV LED S11 emits GUV light, optionally with peak wavelengths in the range of 200-280 nm. Reflector S12 reshapes the emission pattern of LED S11 into a cone with cone angle θ, and baffle S17 trims the emissions further by absorbing high angle stray rays so that to make sure a majority of the of the GUV light emitted by S1 (e.g., ≥90%, or ≥99%, or ≥99.9%) is confined within light cone UVC 1. All the human presence sensors S13 can have a same or similar field of view cones FOV 1 of cone angle α, or the human presence sensors S13 can be catalogued into two kinds with one kind of FOV 1 and the other of FOV 2, respectively of cone angles α, and β, where the inequality β>α>θ holds, and when θ∈[0°, 60°], α, β∈[20°, 120°].

When mounted in a room ceiling, the scattered GUV intensity on the side surface of cone FOV1 is designed to be less than 100 $nW/cm^2$, e.g., in the range of 0-100 $nW/cm^2$. In some embodiments, the scattered GUV intensity SLI on the side surface of cone FOV 1 is expected to be the strongest near the base of the cone intercepting with a surface, e.g., a floor, and it has to be less than 100 $nW/cm^2$. When there is a human in FOV 1, human presence sensor S13 sends signals to the circuit board S111 to turn off the GUV LED S11. Suitable human presence sensors can be applied here, such as passive infrared (PIR) sensors, infrared laser-detector couplers, radio frequency sensors, and radars et al. The important requirements here are to ensure the suitable detection distance (a few meters, e.g., 0-10 m.), sensitivity and field of view angle α (e.g., 20-120°). If there is no human presence in the FOV 1, SUVOS S1 will turn on the GUV LED S11 for an assigned period of time to accumulate a designed dose to the air. The tight confinement of GUV light within cone UVC 1 and the extremely reliable human presence detection make SUVOS S1 safe to disinfect indoor air with human occupants. The additional cone FOV 2 can be used to dim the light source S11. When there is a human in FOV 2 and no human in FOV1, the respective human presence sensor sends signals to circuit board S111 and S111 dims the GUV light output power to a designed level, such as to 50%, or 10% of the original GUV output power.

In one embodiment, the reflector S12 is able to focus the light emitted by LED S11 into a light cone of intensity full-width-at-half-maximum (FWHM) angle ~10°, and with a GUV absorbing cylindrical baffle S17 of diameter 3 cm and height 4 cm, SUVOS S1 is able to deliver a GUV cone UVC 1 of cone angle θ~40° which contains nearly 100% of the GUV light. In this case, baffle S17 trims and absorbs about 48% of the total optical power emitted by LED S11, and the UVC 1 contains the remaining 52% optical power.

When installing this embodiment SUVOS S1 into a ceiling of 2.7 m height measured from the floor, we show in FIG. 12 the TracePro simulated GUV intensity contour map on the floor due to the intercept with cone UVC 1. As seen, cone UVC 1 intercepts with the floor with a base circle of radius ~1.0 m. On the circumference of the base circle the GUV intensity is below 10-3 $W/m^2$, i.e., below 100 $nW/cm^2$.

FIG. 13A plots the TracePro scattered GUV intensity contour map on a vertical plane standing on the floor laterally displaced 1 m away from SUVOS S1 (The plane under investigation is illustrated in FIG. 13B. As seen, the strongest scattered GUV intensity is near the floor and the circumference of GUV cone UVC 1, but it is lower than 10-3 $W/m^2$, i.e., below 100 $nW/cm^2$. Hence, the human presence sensors S13 need to have a FOV 1 of cone angle greater than 40°, i.e., α>40°, e.g., one needs 120°>α>40°. Secondary optics such as a lens can be used to get the desired field of view angles of the human presence sensors.

In another embodiment shown in FIG. 4, SUVOS S2 delivers a GUV light pillar UVP 1 instead of a light cone to the floor to disinfect room air. The main difference of UVC 1 and UVP 1 is the absolute value of the cone angle. The UVC 1 cone angle is optionally in the range of 0 € [0°, 60°], where the cone angle θ for UVP 1 is small, optionally in the range of [0°, 10°]. Strictly speaking, light pillar UVP 1 is a light frustum, as its cone angle is small, the lower and upper bases of UVP 1 are of comparable areas, giving UVP 1 a light pillar appearance. UVP 1 irradiates more confined GUV field so that SUVOS S2 can be applied to public indoor spaces where human occupancy is high. When installed into a ceiling of typical height H~2.7 m, S2 optionally irradiates a GUV light pillar UVP 1 to the floor of a base radius less than a meter, e.g., 0.05-0.5 meters, or 0.1-0.2 meters. SUVOS S2 can also equip with human presence sensors of two different fields of view, e.g., with a FOV 1 and a FOV 2, with respective cone angles α and β as shown in FIG. 4. The functions of cone FOV 1 and FOV 2 are the same as those shown if FIG. 3. Again, β>α>θ. FOV2 includes FOV1. GUV LED 11 only emits GUV light when there is no human in FOV1. When using SUVOS S2 for SIADS applications, equations 5 and 6 also hold true.

Figure 7A:
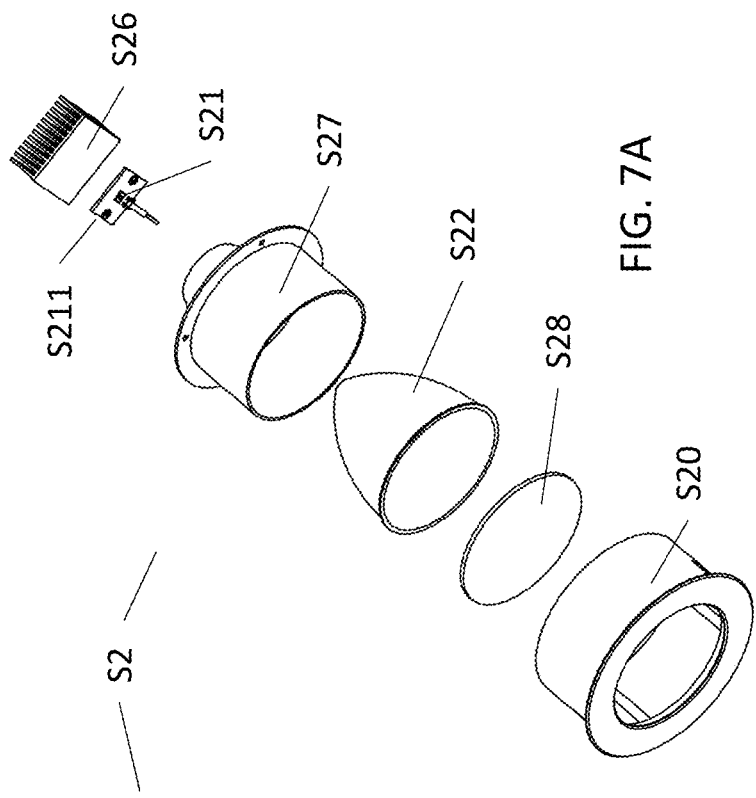
FIGS. 7A, 7B and 7C show various views (exploded, cross sectional and bottom) of an embodiment of a safe ultraviolet optical source according to one aspect of the present disclosure.
Figure 7B:
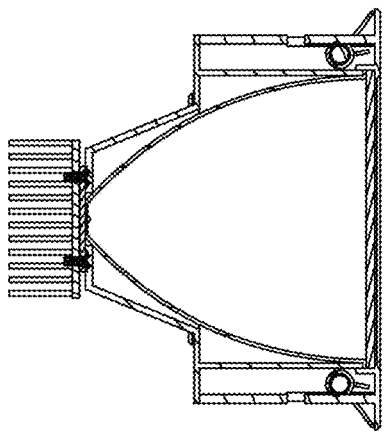
Figure 7C:
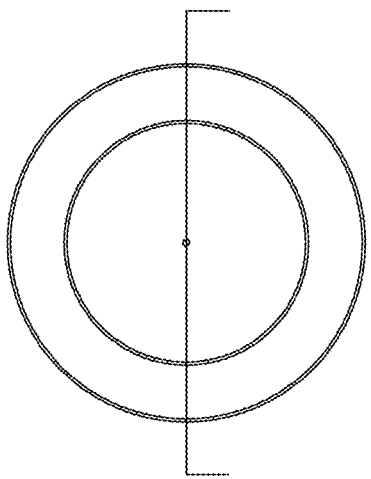

More detailed structure of an embodiment of S2 is shown in FIGS. 7A, 7B and 7C. The key elements of S2 includes a GUV LED S21, a circuit board S211, a reflector S22 to form a collimated GUV beam so as to form UVP 1, a light baffle S27 and a few human presence sensors (not shown). GUV LED S21 emits GUV light, optionally with peak wavelengths in the range of 200-280 nm. Reflector S22 reshapes the emission pattern of LED S11 into a collimated beam with beam angle approaching zero (e.g., 0°-10°), and baffle S27 trims the emissions further by absorbing high angle stray rays so that to make sure a majority of the of the GUV light emitted by S2 (e.g., ≥90%, or ≥99%, or ≥99.9%) is confined within light pillar UVP 1. To form light pillar UVP 1, reflector S22 needs to be large, much larger than the cone forming reflector S12. S22 optionally is a parabolic reflector, of dimensions at least 10 times to that of the light source LED S21 (i.e., to be greater than 5-10 cm). S2 may also include a housing and mount structure S20, to protect the whole unit and facilitate ceiling mounting, a heatsink S26 to dissipate heat generated by LED S21 and circuit board S211, and a status indicator (not shown) to indicate if GUV light is on or off.

Figure 5:
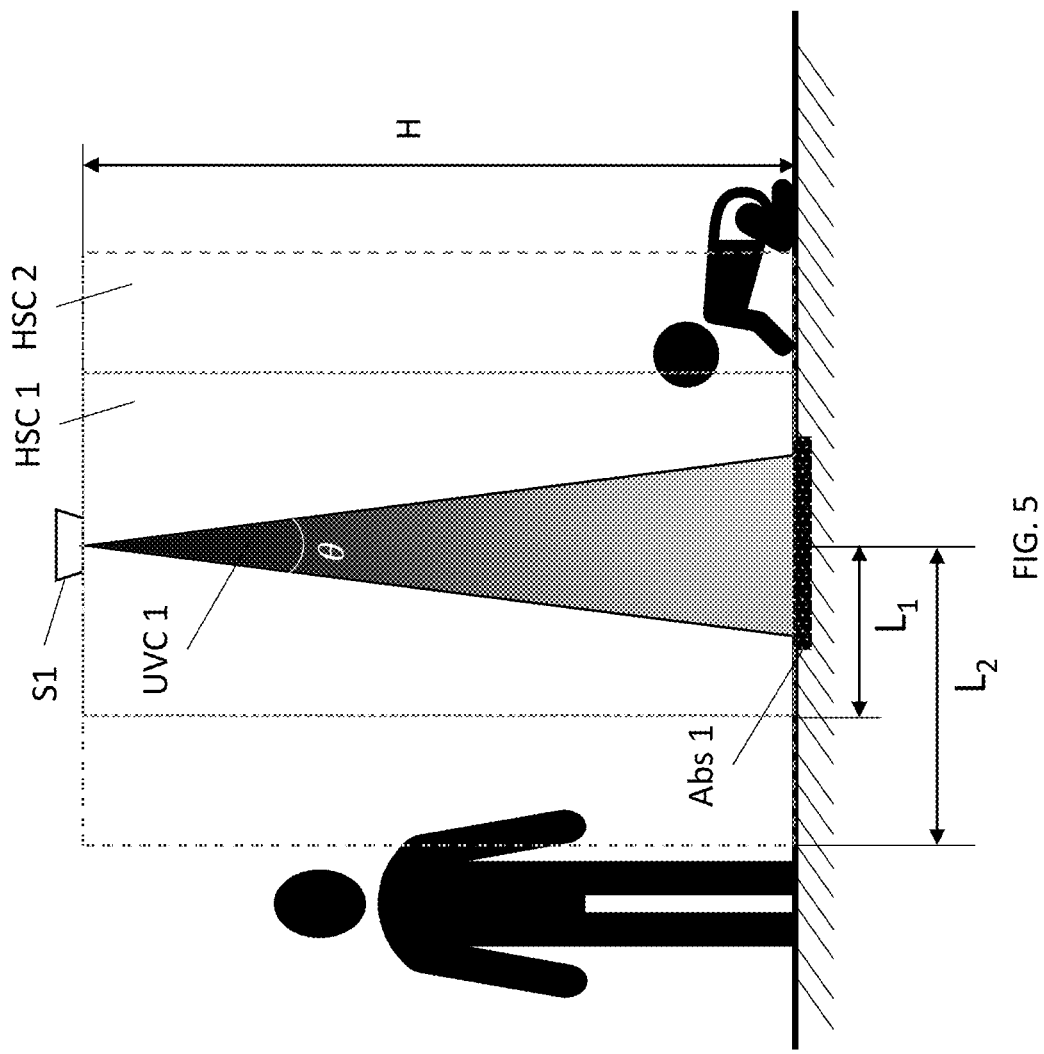
FIG. 5 shows a schematic of a safe ultraviolet optical source delivering a UV disinfection light cone and equipped with two computer generated virtual human screening cylinders.
Figure 6:
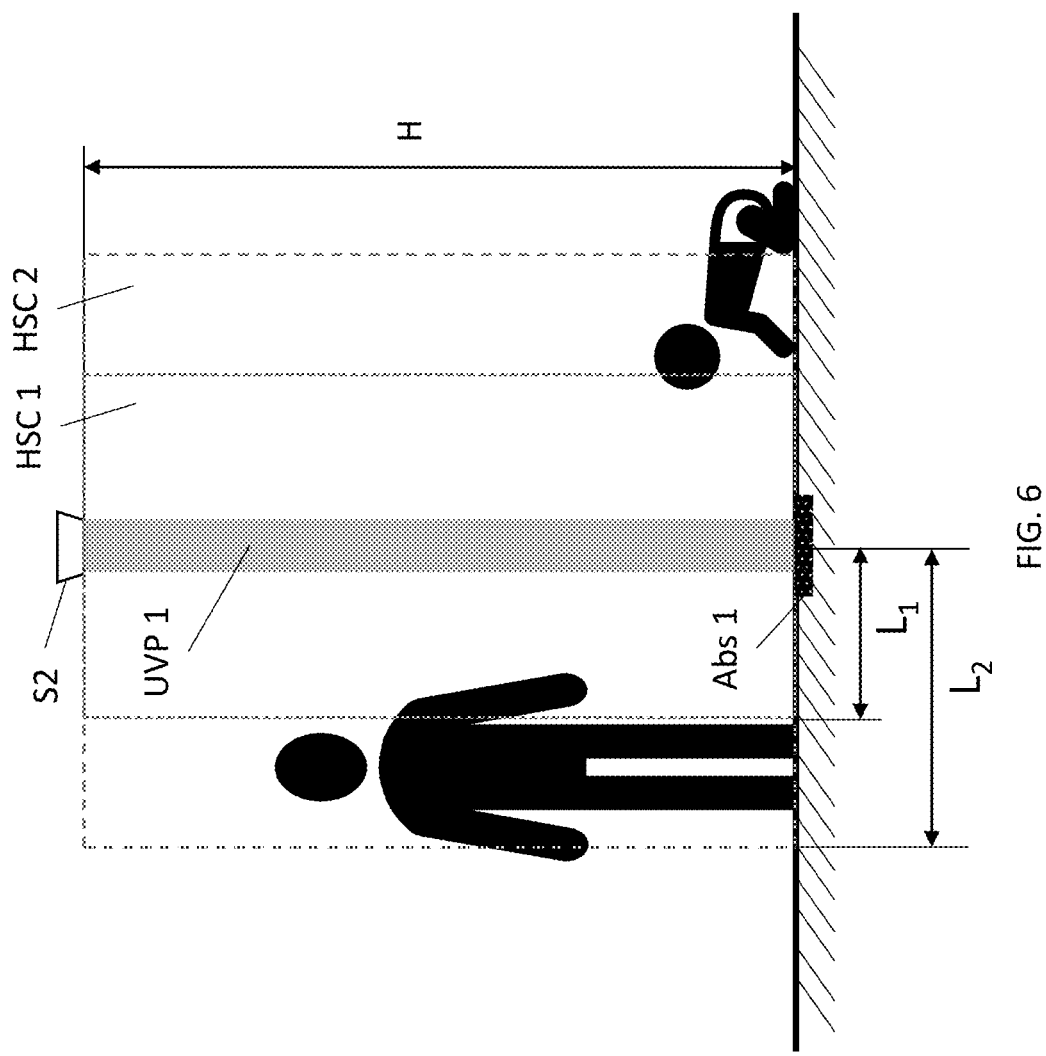
FIG. 6 shows a schematic of a safe ultraviolet optical source delivering a UV disinfection light pillar and equipped with two computer generated virtual human screening cylinders.
Figure 8:
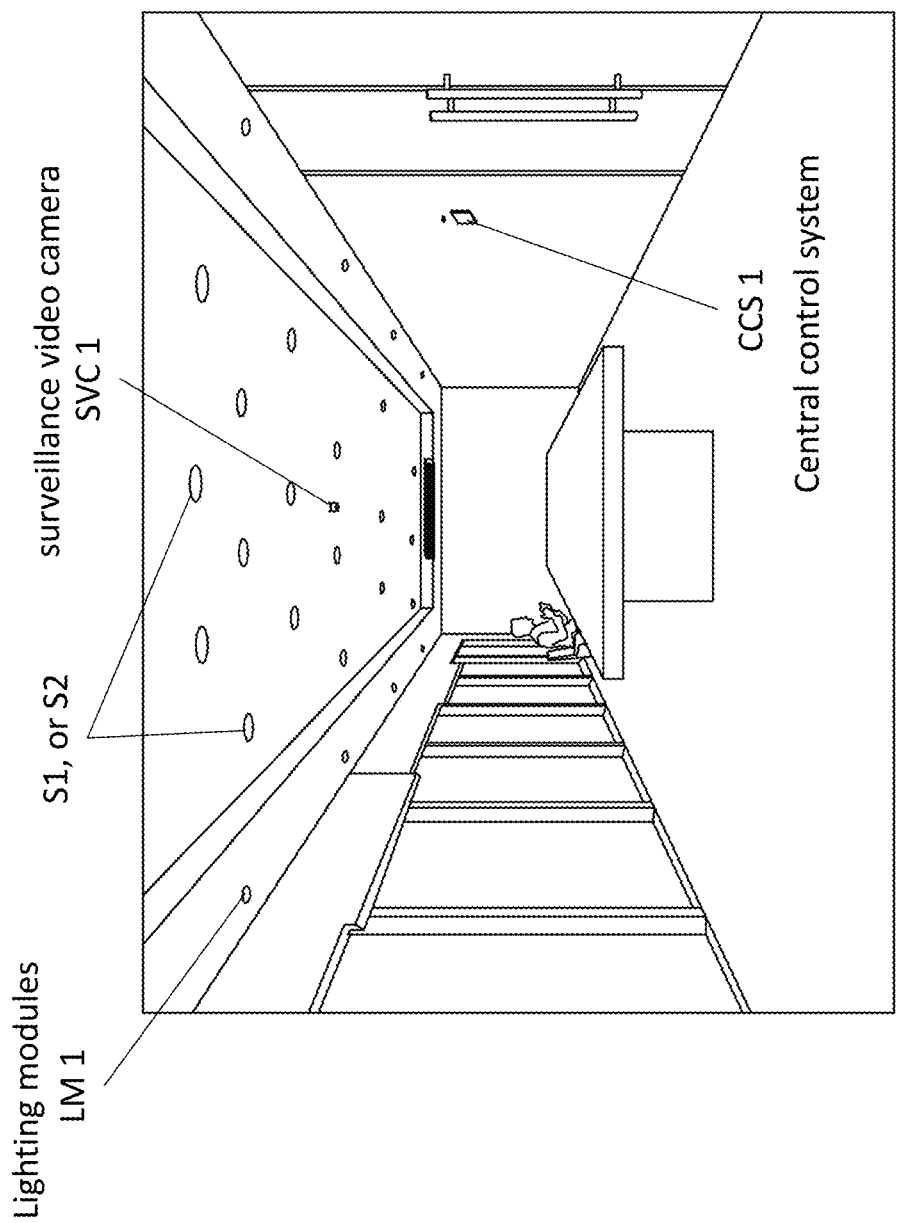
FIG. 8 illustrates an office equipped with a safe indoor air disinfection system according to an aspect of the present disclosure.

FIG. 8 illustrates an office equipped with a group of ceiling mounted SUVOS S1 or S2, besides lighting modules LM 1. To enable intelligent SIADS, i.e., to enable a group of SUVOS mounted in the ceiling to operate according to dynamic human presence conditions, one needs a surveillance video camera (e.g., SVC 1 in FIG. 8) to look over the room and send live video to a central control system (e.g., CCS 1 in FIG. 8). The central control system (CCS) stores detailed coordinate or mapping system of the room in its memory or hard disk. When CCS 1 reads the live video sent by SVC 1, it will first assert the work status of the SVC 1. If SVC 1 is working properly, CCS 1 then will read and recognize human presence and allocate each and every person's coordinates in the room. On the other hand, CCS 1 also has full information and full control about/on the SUVOS S1 or S2 installed in the room. Referring to FIGS. 5 and 6, CCS 1 has generated at least a human screening cylinder (HSC) around each SUVOS. The radii of these HSC's are equal to or slightly larger than the radii of the base circles of the fields of view generated by the human presence sensors S13. When there is human presence in HSC 1, CCS 1 will turn off the respective SUOVS S1 or S2; when there is human presence in HSC 2 and no human presence in HSC1, CCS 1 will dim the respective S1 or S2 for GUV light output power to a designed level, such as to 50%, or 10% of the original GUV output power. In other words, the CCS identifies human interactions with human screening cylinders. The CCS also modulates power to the indoor disinfection system in response to the human interactions with the human screening cylinders, as discussed above and below.

On the cylindrical surface of the HSC 1 the designed GUV intensity is to be less than 100 nW/cm². The radius of HSC 2 is greater than that of HSC 1, i.e., $L_2$>$L_1$. To further reduce GUV scattering, on the floor areas to receive UVC 1 or UVP 1, there are GUV absorption enhancement patches Abs 1, as seen in FIGS. 5 and 6. Abs 1 needs to have diameter or lateral dimension larger than the GUV exposure areas given by UVC 1 and UVP 1. Abs 1 can be formed on the floor as a coating layer of GUV non-reflective and absorptive paints or epoxy, or as a patch made of GUV non-reflective and absorptive materials such as Acrylonitrile Butadiene Styrene (ABS) plastics, vinyl fabrics, GUV resistant carpets, et al. In one embodiment, Abs 1 can be made of phosphors which can generate visible photoluminescence via absorbing GUV photons and re-emitting visible photons to give visible light such as red, yellow, amber, green, and white light. In this embodiment GUV light cones UVC1 or light pillars UVP 1 can be revealed at distance as they generate visible photoluminescence on the GUV absorption enhancement patches Abs 1.

Figure 9:
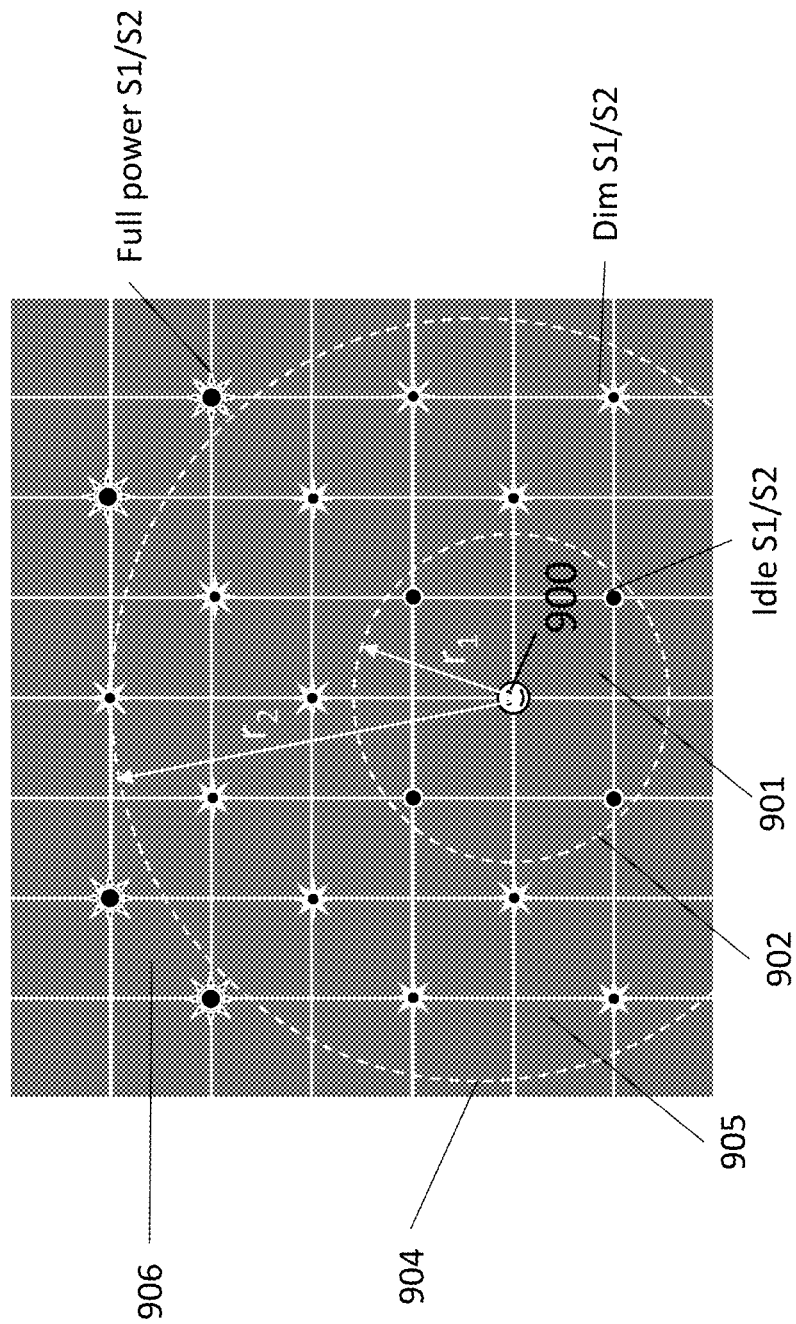
FIG. 9 illustrates a plan view of a room ceiling equipped with safe ultraviolet optical sources (SUVOS), highlighting the SUVOS status surrounding a person in the room.

FIG. 9 illustrates a plan view of a room, where there is a person 900 in the room and the ceiling is installed with many SUVOS S1 or S2. Because of the human sensor generated fields of view FOV 1 and FOV 2, and/or computer-generated HSC 1 and HSC 2, the ceiling SUVOS' have been in three different statuses separated by two virtual circles centered at the person 900: an off circle 902 and a dim circle 904. The radii $r_1$ and $r_2$ of the off and dim circles are respectively equal to $L_1$ and $L_2$, where $L_1$ and $L_2$ are the radii of HSC 1 and HSC 2, respectively, or the radii of the base circles of FOV 1 and FOV 2, respectively. The SUVOS's within the off circle (including those on the off circle 902) are in an off zone 901 and are turned off. The SUVOS' out of the dim circle (excluding the ones on the dim circle) are in an action zone 906 and are turned on for full power operation. The SUOVS' in-between the off and the dim circles are in a dim zone 905 and are operated in dim mode to give much less GUV output power. In another embodiment, the dim zone can be merged into the off zone so that SUVOS's only have two working statuses: off or on.

Figure 10:
FIG. 10 illustrates a shopping mall equipped with a safe indoor air disinfection system according to an aspect of the present disclosure.

FIG. 10 illustrates a public space such as a shopping mall equipped with a SIADS according to an aspect of the present disclosure. The SIADS controls SUVOS' installed in the ceiling and will generate dynamic off/dim/action zones around each person in the building. The GUV cones UVC 1 and/or GUV light pillars UVP 1 operate dynamically according to the distance that they are from a person to ensure humans are free of GUV irradiation, yet the indoor air is constantly disinfected.

Figure 11:
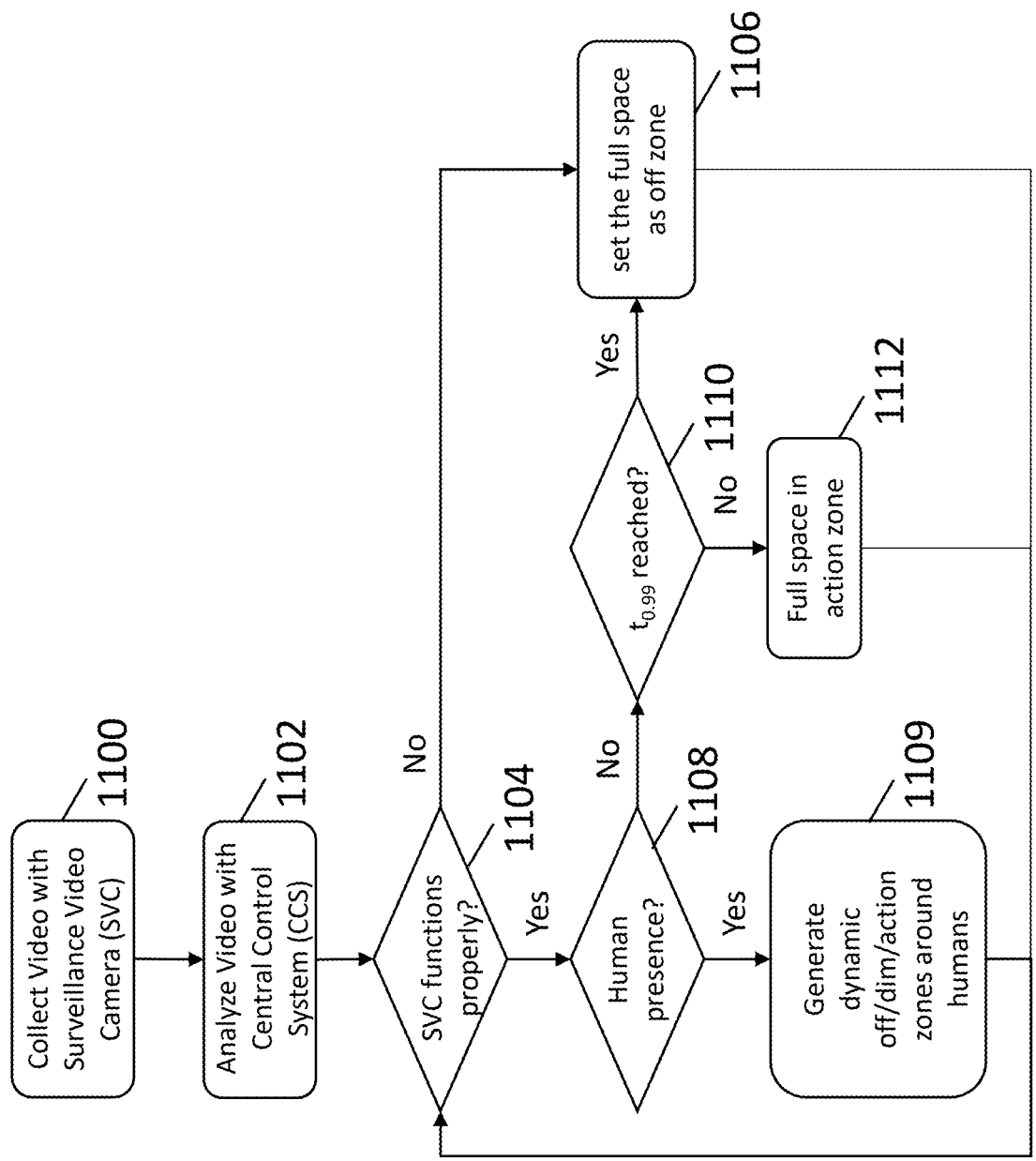
FIG. 11 outlines the main protocol of a safe indoor air disinfection system according to an aspect of the present disclosure.
Figure 12:
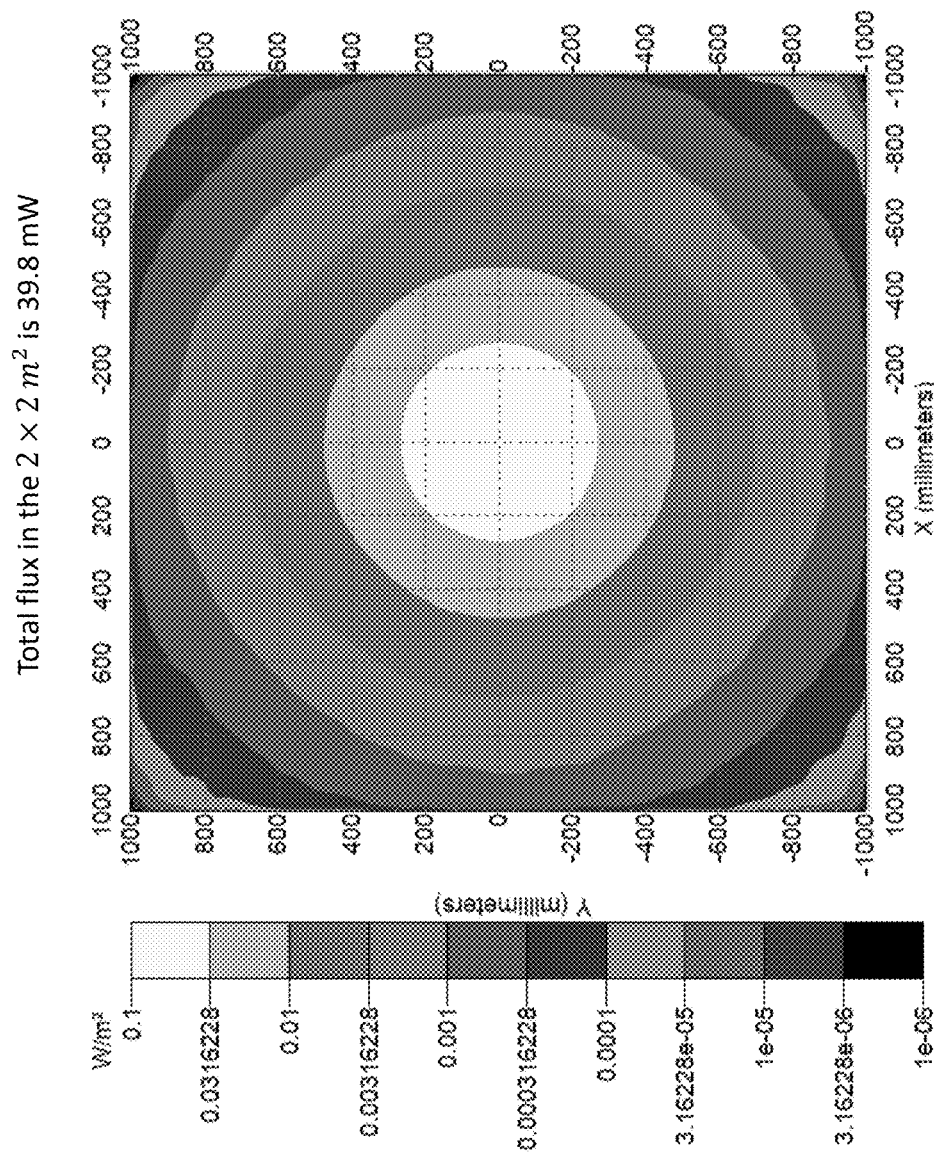
FIG. 12 plots the TracePro simulated GUV intensity contour map on a floor delivered by a safe ultraviolet optical source (SUVOS), which is installed on a ceiling of height 2.7 m.
Figures 13A, 13B:
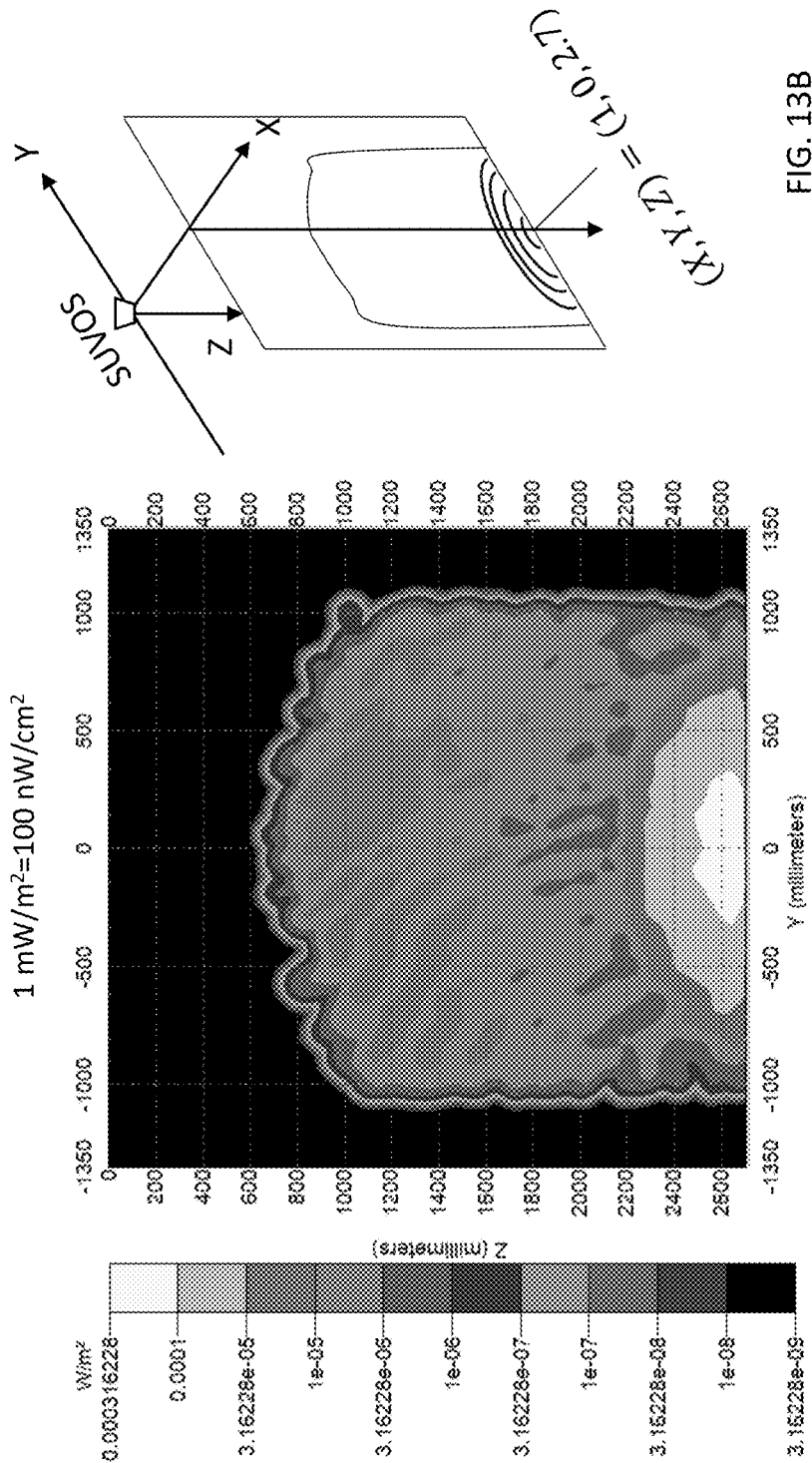
FIG. 13A plots the TracePro simulated GUV intensity contour map on a vertical plane standing on the floor extending to the ceiling displaced laterally 1 m away from a safe ultraviolet optical source (SUVOS), which is installed on the ceiling of height 2.7 m.
FIG. 13B illustrates the physical orientation of the SUVOS.

FIG. 11 outlines the main protocol of an intelligent SIADS according to an aspect of the present disclosure. The Surveillance Video Camera SVC 1 collects live video 1100. The live video is analyzed 1102 by the Central Control System CCS 1. It is determined if the SVC is functioning properly 1104. This judgement can be based on the fact that CCS 1 constantly receives a known movement as a reference in the background of the room to see if the SVC 1 catches such a reference movement. If CCS 1 determines that SVC 1 is not working properly (1104—No), it will immediately set the whole group of SUVOS in off zone 1106 and cut their power sources so that no GUV light can be generated. If SVC 1 is working properly (1104—Yes), CCS 1 will do human recognition in the live video 1108 and identify each and every occupant's coordinates in the room and use these coordinates to zone the whole room according to the distance of a person to SUVOS 1109. This process is dynamic as people move around in the room. If there is no person in the room, CCS 1 will calculate to see if a preset desired disinfection time is achieved 1110. If not achieved yet (1110—No), CCS 1 will set the full space as action zone and light up all SUVOS' to the full power 1112. If the desired disinfection time is achieved (1110—Yes) CCS sets the full space as an off zone and deactivates all SUVOS 1106. The flow chart of FIG. 11 is continuously repeated by CCS 1.

SUVOS and SIADS can also be applied in other confined spaces such as vehicles, airplanes, trains, et al. The present disclosure has been described using exemplary embodiments. However, it is to be understood that the scope of the present disclosure is not limited to the disclosed embodiments. On the contrary, it is intended to cover various modifications and similar arrangement or equivalents which can be obtained by a person skilled in the art without creative work or undue experimentation. The scope of the claims, therefore, should be accorded the broadest interpretation to encompass all such modifications and similar arrangements and equivalents.

One skilled in the art will recognize that embodiments of the present disclosure described herein may be performed in a variety of ways and using a variety of means. Those skilled in the art will also recognize additional modifications, applications, and embodiments are within the scope thereof, as are additional fields in which the disclosure may provide utility. Accordingly, the embodiments described are illustrative of specific embodiments of the disclosure and are meant to avoid obscuring the disclosure.

What is claimed is:

1. An indoor disinfection system, comprising:
    a collection of lighting units, each lighting unit including a germicidal ultraviolet (GUV) light source emitting a GUV light cone with a GUV light cone angle less than 60 degrees, the GUV light cone containing optical power with wavelengths between 10-280 nm;
    a human presence sensor with a field of view cone angle greater than the GUV light cone angle, the human presence sensor generating a human presence signal in response to a human in a field of view;
    a controller to receive the human presence signal and in response thereto disable the GUV light source; and
    a video camera and a central control system to process video from the video camera.

2. The indoor disinfection system of claim 1, wherein the central control system identifies human interactions with human screening cylinders.

3. The indoor disinfection system of claim 2, wherein the central control system is programmed to modulate power to the indoor disinfection system in response to the human interactions with the human screening cylinders.

4. The indoor disinfection system of claim 1, further comprising a second human presence sensor with a second field of view cone angle greater than the field of view cone angle, the second human presence sensor generating a second human presence signal in response to a human in a second field of view.

5. The indoor disinfection system of claim 4, wherein the controller receives the second human presence signal and in response thereto reduces the power of the GUV light source by at least 50% when there is no human presence signal generated by the human presence sensor.

6. The indoor disinfection system of claim 1, wherein the GUV light cone contains over 90% of GUV light emitted by the GUV light source.

7. The indoor disinfection system of claim 1 mounted in a ceiling producing the GUV light cone with optical power of intensity less than 100 nW/cm$^2$ at a circumference of a GUV light cone base.

8. The indoor disinfection system of claim 1, wherein scattered GUV intensity on side surface of a field of view cone is less than 100 nW/cm$^2$.

9. The indoor disinfection system of claim 1, wherein the field of view cone angle is 120 degrees or less.

10. The indoor disinfection system of claim 1, wherein the human presence sensor is a passive infrared sensor.

11. The indoor disinfection system of claim 1, wherein the human presence sensor is an infrared laser-detector coupler.

12. The indoor disinfection system of claim 1, wherein the human presence sensor is a radio frequency sensor.

13. The indoor disinfection system of claim 1, wherein the human presence sensor is a radar.

14. The indoor disinfection system of claim 1 with an optical power of 1000 mW or less.

15. The indoor disinfection system of claim 1 mounted in a ceiling producing the GUV light cone with a floor base radius of 2 meters or less.

16. The indoor disinfection system of claim 1, mounted in a ceiling producing a GUV light pillar with a cone angle less than 10 degrees and a floor base radius of 1 meter or less.

17. The indoor disinfection system of claim 1, further comprising a visible light source.

* * * * *